US011855972B2

(12) United States Patent
Kallugudde

(10) Patent No.: US 11,855,972 B2
(45) Date of Patent: Dec. 26, 2023

(54) MERCHANT IDENTIFICATION AND SECURE DATA TRANSFER

(71) Applicant: Mastercard International Incorporated, New York, NY (US)

(72) Inventor: Manu Dharmaiah Kallugudde, Maidenhead (GB)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 85 days.

(21) Appl. No.: 17/216,593

(22) Filed: Mar. 29, 2021

(65) Prior Publication Data
US 2021/0306312 A1   Sep. 30, 2021

(30) Foreign Application Priority Data

Mar. 30, 2020 (EP) .................................... 20166858

(51) Int. Cl.
*H04L 9/40* (2022.01)
*G06Q 20/12* (2012.01)
*G06Q 20/40* (2012.01)
*G06Q 40/02* (2023.01)

(52) U.S. Cl.
CPC ............. *H04L 63/08* (2013.01); *G06Q 20/12* (2013.01); *G06Q 20/4014* (2013.01); *G06Q 20/4016* (2013.01); *G06Q 40/02* (2013.01); *G06Q 2220/00* (2013.01)

(58) Field of Classification Search
CPC .... H04L 63/08; G06Q 20/12; G06Q 20/4014; G06Q 20/4016; G06Q 40/02; G06Q 2220/00
See application file for complete search history.

(56) References Cited

U.S. PATENT DOCUMENTS

| 10,404,703 | B1 | 9/2019 | Peterson | |
|---|---|---|---|---|
| 2010/0327054 | A1 | 12/2010 | Hammad | |
| 2013/0262858 | A1* | 10/2013 | Neuman | ................... H04L 9/30 713/155 |

(Continued)

FOREIGN PATENT DOCUMENTS

WO    2014081494 A1   5/2014

OTHER PUBLICATIONS

Zouina, et al.; Towards a Distributed Token Based Payment System Using Blockchain Technology; 2019 International Conference on Advanced Communication Technologies and Networking (CommNet); 2019. DOI: 10.1109/COMMNET.2019.8742380.

*Primary Examiner* — Chau Le
(74) *Attorney, Agent, or Firm* — Pramudji Law Group PLLC; Ari Pramudji

(57) ABSTRACT

The present disclosure relates to a computer-implemented method of processing a data transfer. The method comprises generating a first identifier for a first entity; linking the first identifier with a second identifier associated with a second entity; sending the first identifier and the second identifier to the first server; verifying the first entity based at least on the first identifier and the second identifier; sending a message to a second server, the message comprising at least the first identifier, the second identifier, and a name associated with the first identifier; and authenticating the data transfer for the first entity based at least on the information contained in the message.

9 Claims, 5 Drawing Sheets

(56) References Cited

U.S. PATENT DOCUMENTS

| | | | |
|---|---|---|---|
| 2013/0332344 A1* | 12/2013 | Weber | G06Q 20/385 |
| | | | 705/39 |
| 2015/0127547 A1* | 5/2015 | Powell | G06Q 20/20 |
| | | | 705/67 |
| 2017/0221056 A1 | 8/2017 | Karpenko et al. | |
| 2017/0373852 A1* | 12/2017 | Cassin | G06Q 20/385 |
| 2018/0025354 A1* | 1/2018 | Groarke | G06Q 20/382 |
| | | | 705/44 |
| 2019/0318345 A1* | 10/2019 | Kallugudde | G06Q 20/3226 |
| 2020/0027078 A1* | 1/2020 | Kallugudde | G06Q 20/3674 |
| 2020/0090184 A1* | 3/2020 | Kallugudde | G06Q 20/4014 |

* cited by examiner

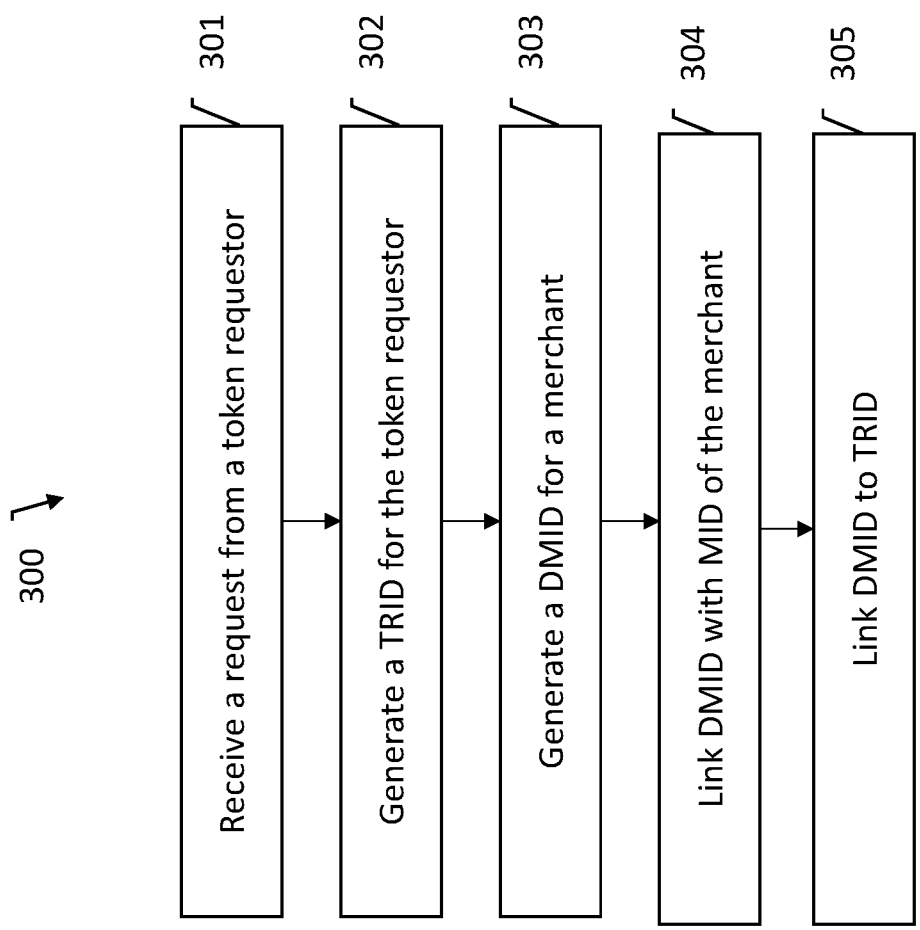

MERCHANT IDENTIFICATION AND SECURE DATA TRANSFER

FIELD OF INVENTION

The present invention relates to a method of processing a data transfer after verifying the identity of an online entity. More specifically, the invention relates to merchant binding in e-commerce transactions.

BACKGROUND

It is often the case in a system involving multiple data processing devices that a sensitive data payload needs to be passed between said data processing devices. Typically the party or parties seeking to protect the sensitive data do not have control over at least some of the network links over which the sensitive data payload is transmitted, e.g. in the case where a network link involves a public network component such as a transmission over the internet. The trust level of such links may be less than ideal, which can enable an unauthorized party to intercept communications over these links, e.g. in a 'man in the middle' attack.

One example of a system where this consideration comes into play is an e-commerce platform through which a consumer buys a product or a service from a merchant by making an online transaction. The merchant must separately contact an issuer and provide a token and a cryptogram associated with the transaction in order to receive its share of the payment. While the use to tokens and cryptogram prevents unauthorized access of consumer payment card credentials, an intercepted token may be used by a fraudulent entity to perform an unauthorized transaction.

In existing systems, an issuer identifies a merchant passing the token using its merchant ID or name. This may not be ideal for verifying the identity of the merchant as the fraudulent entity may masquerade as the genuine merchant by obtaining such information from the merchant.

The present invention may ameliorate one or more of the problems mentioned above and in particular may reduce the likelihood of success of a fraudulent data transfer or transaction.

SUMMARY OF THE INVENTION

According to an aspect of the invention, there is provided a computer-implemented method of processing a data transfer comprising generating a first identifier for a first entity; linking the first identifier with a second identifier associated with a second entity; sending the first identifier and the second identifier to the first server; verifying the first entity based at least on the first identifier and the second identifier; sending a message to a second server, the message comprising at least the first identifier, the second identifier, and a name associated with the first identifier; and authenticating the data transfer for the first entity based at least on the information contained in the message.

Advantageously, using this method an issuer can rely on two identifiers to verify a merchant during a transaction authorization. As at least one of these identifiers is generated securely by a secure remote server and is unique to each merchant, the chances of fraud are minimized.

Preferably, the method further comprises generating the second identifier by the first server upon receiving a request from the second entity.

Preferably, the method further comprises generating the first identifier by the first server upon receiving a request from the first entity.

Preferably, the method further comprises generating the first identifier by the first server upon receiving a request from the second entity on behalf of the first entity.

Preferably, the message includes a name associated with the second identifier.

Preferably, the method further comprises generating a token to initiate the data transfer based at least on the first identifier and the second identifier.

Preferably, the method further comprises requesting a cryptogram from the first server to initiate the data transfer.

Preferably, the message includes a validation result of the cryptogram.

Preferably, authenticating the data transfer comprises reviewing the validation result.

According to another aspect of the invention, there is provided a system for processing a data transfer comprising a first entity configured to request a first identifier by providing information relating to the first entity; a second entity configured to request a second identifier and to link the second identifier to the first identifier; a first server configured to generate a message comprising at least the first identifier, the second identifier, and a name associated with the first identifier; a second server configured to authenticate the data transfer based at least on the information contained in the message.

Preferably, the first server is further configured to generate a token to initiate the data transfer based at least on the first identifier and the second identifier.

Preferably, the message further comprises a name associated with the second identifier and a cryptogram to initiate the data transfer.

Preferably, the first entity and the second entity are the same.

Preferably, the data transfer is a transaction processed by the first entity or the second entity for a customer.

Preferably, the first server is a transaction-enabling service provider and the second server is an issuer.

BRIEF DESCRIPTION OF THE DRAWINGS

Embodiments of the present invention are described below, by way of example only, with reference to the accompanying drawings, in which:

FIG. 3 is a flow diagram of a method implemented in the system of FIG. 1;

DETAILED DESCRIPTION

As used herein, the followings terms have the following meanings:

Sensitive data: data that should be exposed in cleartext form to authorized entities only. Examples of sensitive data include a Primary Account Number (PAN) or Funding Primary Account Number (FPAN), a private key, a cryptogram and an authentication credential.

Token: an entity that acts as a placeholder for a corresponding item of sensitive data, where typically the token is generated in some predictable manner from the sensitive data item such that entities in possession of the knowledge of how the token was generated can obtain the sensitive data from the token. An example of a token is an alphanumeric string that is generated based on a PAN.

Secure storage medium: a storage medium that only authorised entities can retrieve data from. An example of a secure storage medium is a data store that is accessible only via a private network or virtual private network. Access may be granted only upon provision of an authentication credential, e.g. a password. A secure storage medium may include one or more encrypted volumes.

Eavesdropping: the act or process of infiltrating a communication channel so as to intercept data transmitted over said channel, as committed by a party that is not authorised to gain access to data transmitted over said channel. Eavesdropping is typically a fundamental part of a man in the middle attack.

Trusted channel: a communications path that is hardened against attempts to gain access by unauthorised third parties, e.g. by eavesdropping. A virtual private network (VPN) or a private network are examples of trusted channels.

Public network component: a network component such as a switch, router, server, etc. that is accessible by any data processing device. Typically, little or no authentication is required to access a public network component.

Merchant binding: a process undergone by a merchant during a 'set up' or 'onboarding' phase, occurring before the merchant is able to process transactions in an e-commerce system.

Figure 1:
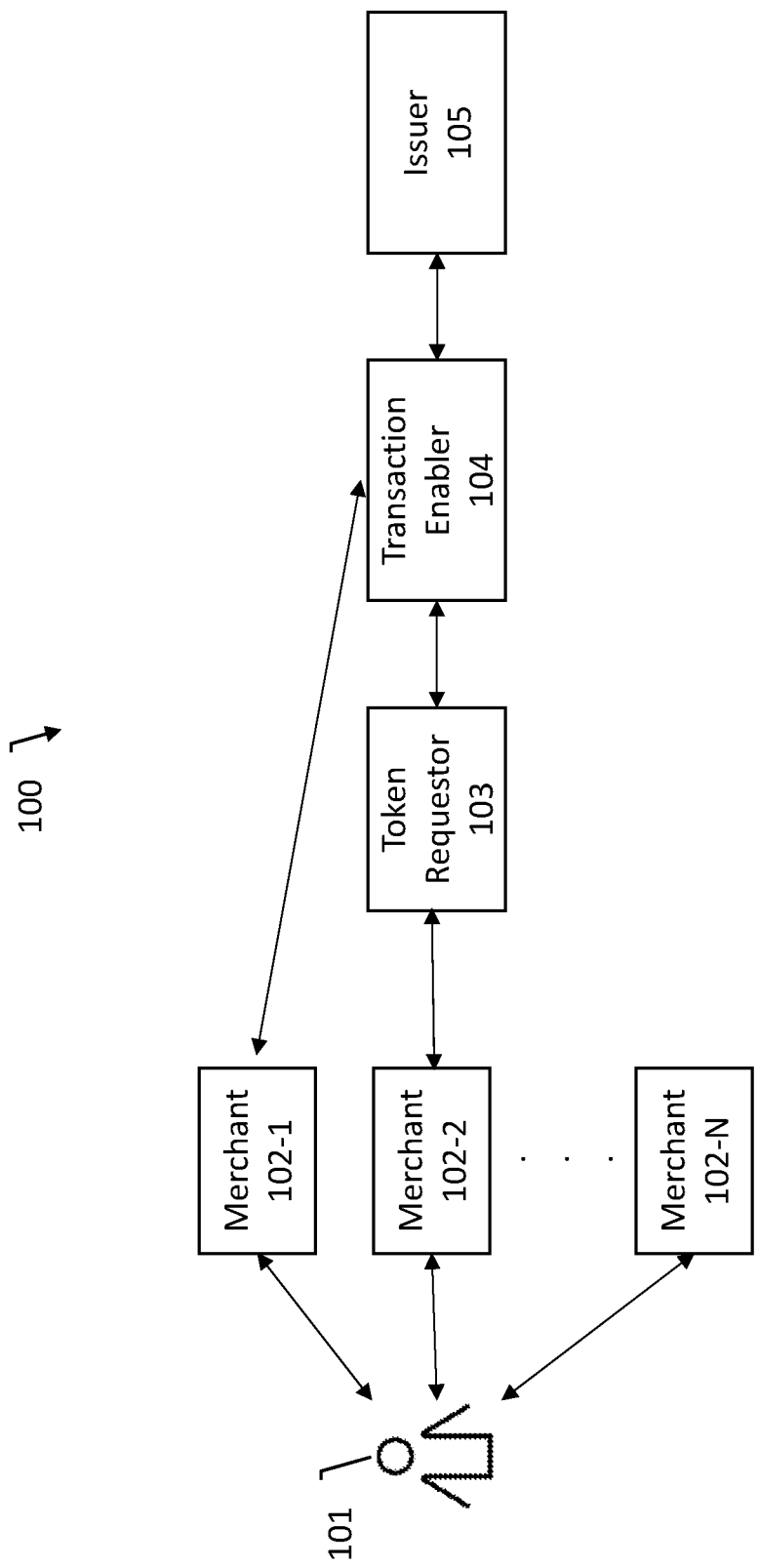
FIG. 1 is a schematic diagram of a system comprising various entities involved in an e-commerce transaction.

FIG. 1 shows a system 100 that is arranged to process data transfer between various interconnected entities online. In the present example, the system 100 is configured to process e-commerce transactions. The system 100 comprises a user 101, a plurality of merchants 102-1 to 102-N, a token requestor 103, a transaction enabler 104, and an issuer 105.

The user 101 is associated with a payment device such as a credit or debit card and/or with a personal computing device such as a mobile phone. The mobile phone may have a digital wallet with saved credit/debit card details which the user can use to pay for a service or goods bought from one or more of the merchants 102. Such a credit/debit card is typically linked to a personal account number (PAN) of the user.

The merchants 102 are retailers that offer services and goods to the users through an online portal. Some merchants, such as merchant 102-1, are directly engaged with the transaction enabler 104 to process transactions. Others, such as merchant 102-2, may engage with the token requestor 103 which processes the transactions on behalf of the merchant 102-2. The token requestor 103 is an entity that provides merchant online services for accepting electronic payments from the users for the goods or services bought from the merchants 102 online. The token requestor 103 is essentially an interface between the merchants 102 and the transaction enabler 104.

The transaction enabler 104 is a payment service provider that enables secure transactions between the user 101, the merchants 102, and the issuer 105. This allows the issuer 105 and the merchants 102 to manage tokenization and digitization to create security for every transaction. It also gives the user 101 assurance of secure digital payments made from a variety of connected devices. Mastercard® Digital Enablement Service (MDES®) is an example of a transaction enabler. The transaction enabler 104 is typically connected to the issuer 105 through a secure channel to obtain approval for the transactions. The issuer 105 issues the debit/credit to the user 101 and preferably holds an account for the user. The issuer 105 also safely stores sensitive information such as user's PAN, user personal details, merchant ID, etc.

It is to be understood that the system 100 may include other entities such as acquirers, directory servers, and intermediate network devices which are known in the art. Also, processes of tokenization and digitization used in e-commerce and banking systems are not described in detail as they are well-known to the skilled person.

Typically, a merchant requests a token request identifier (TRID) from the transaction enabler 104 during a merchant onboarding process. In such a case, TRID identifies both the merchant and channel/tokenization domain. In case of a direct merchant, such as the merchant 102-1, a unique TRID is assigned to the merchant 102-1 by the transaction enabler 104. However, in case of an indirect merchant, such as the merchant 102-2, the token requestor 103 requests the TRID on behalf of the merchant 102-2 as well as other similar merchants. A unique TRID is assigned to the token requestor 103 which also serves to identify all the merchants that are managed by the token requestor 103. When authorizing a transaction, the issuer 105 will rely on merchant ID (MID) and merchant name of each merchant to identify the merchant. In this scenario, it is easy for a fraudster to obtain a merchant ID and merchant name and pretend to be a genuine merchant performing a transaction.

In the present invention, there is provided a digital merchant identifier (DMID) associated with each merchant. For the direct merchant, such as the merchant 102-1, along with a TRID, the merchant also requests a DMID from the transaction enabler 104. For the indirect merchants, such as the merchant 102-2, either the merchant 102-2 itself or via the token requestor 103 requests a DMID from the transaction enabler 104. In this scenario, the TRID only identifies channel/tokenization domain but DMID identifies the merchant. The issuer 105 can therefore rely on the DMID and DMID name to identify the merchant during authorization. As DMIDs are generated securely by the transaction enabler 104 and unique to each merchant, the chances of fraud are minimized.

Figure 2B:
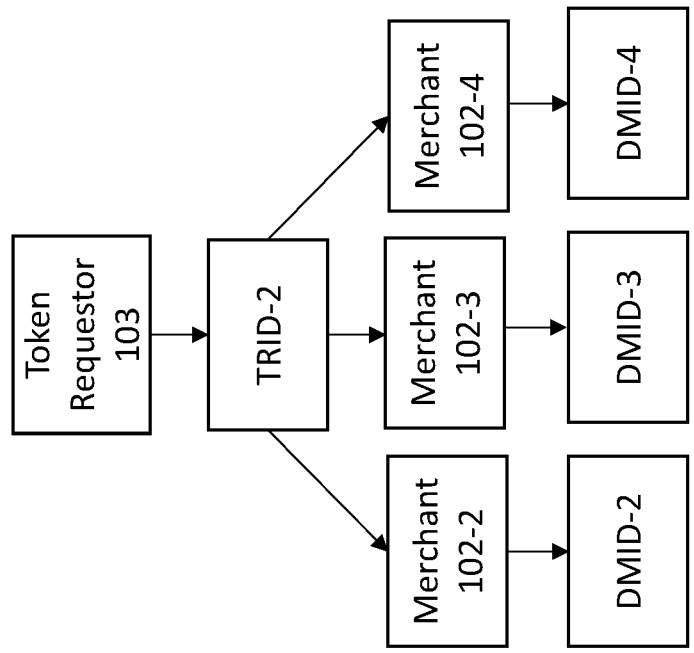
FIGS. 2A-2B show different types of merchant identification and onboarding scenarios in the system of FIG. 1.
Figure 2A:
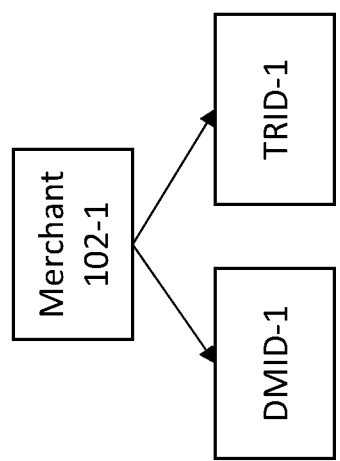

FIG. 2A shows the merchant 102-1 associated with unique DMID-1 and unique TRID-1, as obtained from the transaction enabler 104. DMID-1 and TRID-1 are linked together during the onboarding process. FIG. 2B shows the token requestor 103 associated with unique TRID-2 and each merchant 102-2, 102-3, 102-4 associated with DMID-2, DMID-3, DMID-4 respectively. Each DMID is linked to TRID-2. For example, for the merchant 102-2, DMID02 is linked to TRID-2. In this way, using the combination of DMID and TRID it is possible to uniquely identify each merchant along with their channel/tokenization domain.

FIG. 3 shows a method 300 of merchant binding according to one embodiment of the invention. At step 301, a request is received from a token requestor. In the present example, the token requestor 103 sends a request to the transaction enabler 104 to obtain a TRID. TRID is a unique identifier that is required by the merchants to process the transactions securely with the transaction enabler 104. As the token requestor 103 provides payment services to a plurality of merchants, such as the merchants 102-2, 102-3, and 102-4, the token requestor 103 obtains a TRID on behalf of these merchants. A direct merchant, such as the merchant 102-1, obtains a TRID directly from the transaction enabler 104. Therefore in that case, the merchant is the token requestor.

At step 302, a TRID is generated for the token requestor. In the present example, upon receiving a request from the token requestor 103 (or the merchant 102-1), the transaction enabler 104 generates a unique TRID for the token requestor 103. The TRID could be in any suitable format and is used to identify the channel/tokenization domain.

At step 303, a DMID is generated for a merchant. In the present example, a DMID is generated for merchants 102. It is possible for the merchants 102 (either direct or indirect) to register with a self-service portal managed by the transaction enabler 104 to generate DMIDs. For DMID registration, the merchants need to provide some information to the transaction enabler 104. Such information may include merchant full legal name, country, merchant country code, website URL, and merchant ID (MID). MID is a unique self-generated identifier for each merchant. A DMID generated by the transaction enabler 104 is associated with a DMID name. DMID name can be a short for the merchant full legal name. For example, a merchant named XY Limited, may have its DMID name as XY. After the DMID is generated, an indirect merchant, such as the merchant 102-2, passes its DMID to the token requestor 103. Alternatively, the token requestor 103 may generate DMIDs on behalf of the merchants. It is to be noted that each merchant is associated with a unique DMID which is used to identify the merchant.

At step 304, DMID and MID for the merchant are linked. In the present example, after the DMID generation, the token requestor 103 links the DMID to the MID for each merchant it is servicing. For direct merchants, they link their MID to the generated DMID themselves. In this way, each merchant is associated with a self-generated identifier (MID) and a third-party generated identifier (DMID).

At step 305, DMID is linked to TRID. In the present example, the token requestor 103 links the unique DMID for each merchant with a common TRID previously generated for the token requestor 103. For direct merchants, such as the merchant 102-1, they link their unique DMID to their previously generated unique TRID. Such associations are shown in FIGS. 2A-2B. With the combination of DMID and TRID, token ownership and usage can be determined.

Figure 4:
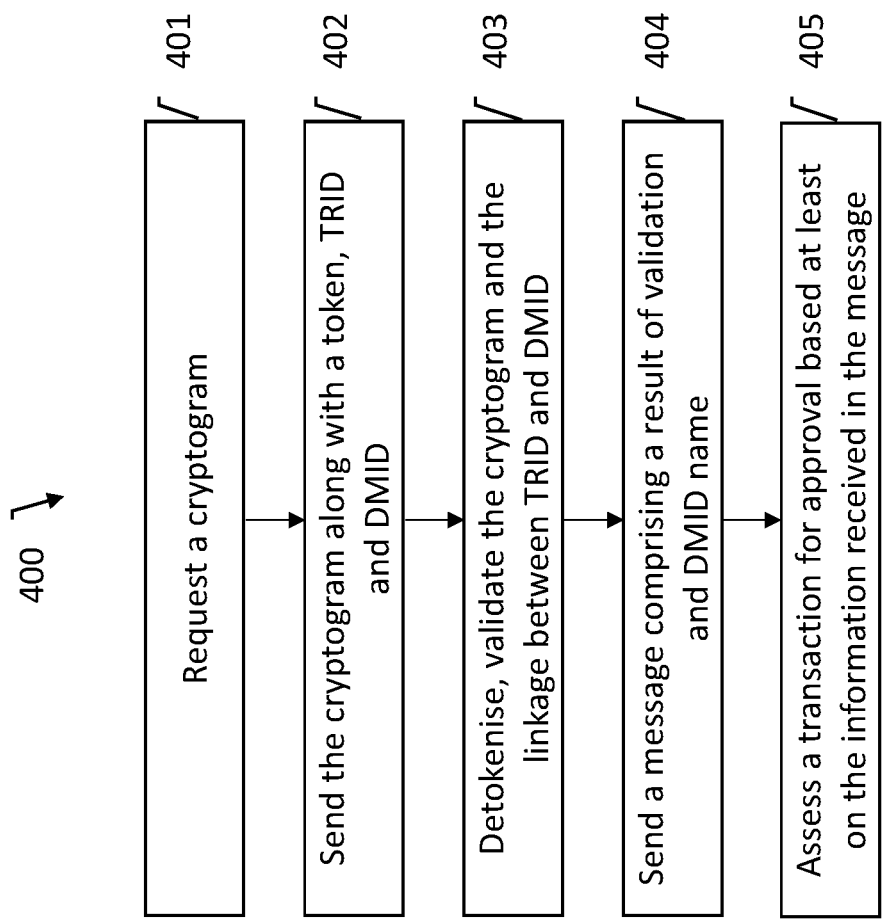
FIG. 4 is a flow diagram of a method implemented in the system of FIG. 1.

FIG. 4 shows a method 400 for processing a transaction using merchant binding according to an embodiment of the invention. At step 401, a cryptogram is requested. In the present example, a merchant such as the merchant 102-1 or the token requestor 103 on behalf of a merchant such as the merchant 102-2 requests a cryptogram from the transaction enabler 104. A cryptogram such as a DSRP cryptogram known in the EMV standard is used to enable secure transactions for remote payments made via the transaction enabler 104.

At step 402, the cryptogram is sent along with a token, TRID and DMID. In the present example, to initiate a transaction processing, the merchant 102-1 or the token requestor 103 sends a cryptogram with a token, TRID, DMID, and DMID name to the transaction enabler 104 in an authentication request message. The token may be generated (or pre-stored) by the merchant or the token requestor requests it from a tokenization platform. The token is also associated with a token expiry which is also sent along with the token. It is to be noted that one token is generated per merchant (DMID), token requestor (TRID), FPAN, and user combination. In case, DMID is not linked to TRID, DMID and DMID name will not be present in the authentication request message.

At step 403, the token is detokenized, cryptogram is validated, and the linkage between TRID and DMID is verified. In the present example, the transaction enabler 104 authenticates a transaction request by validating the cryptogram as well as verifying the linkage between the DMID, MID, and TRID. As the transaction enabler 104 originally generated the DMID, TRID for the merchant, it can compare the stored linkage with that received in the transaction request to verify the identity of the merchant as well as the channel/tokenization domain. The transaction enabler 104 also detokenizes the received token to obtain the FPAN of the user 101.

At step 404, a message is sent comprising a result of the validation and DMID name. In the present example, the transaction enabler 104 sends a message to the issuer 105 to obtain an approval for the transaction. The message includes a validation result of the cryptogram as well as that of the linkage of DMID and TRID. The message may also include DMID, DMID name, TRID, and token requestor name. In addition, the transaction enabler 104 also sends the FPAN of the user as retrieved from the token.

At step 405, a transaction is assessed for approval based at least on the information received in the message. In the present example, upon receiving the message, the issuer 105 inspects the information contained in the message. If the validation result is positive, DMID name, MID, etc. match the issuer's records, and the FPAN is correctly identified as belonging to the user 101, the transaction is approved. However, the issuer 105 may choose to 'step up' to further verify the user 101 for enhanced security. For example, by sending a one-time password (OTP) to a registered user device or by asking some security questions such as postal address, date of birth, etc. This is likely to be the case when there is no DMID and DMID name present in the message.

Once the transaction is approved, the issuer 105 sends an acknowledgement to the transaction enabler 104 which in turn sends a confirmation message to the user 101 and the associated merchant 102. The issuer 105 may also send a confirmation directly to the user 101.

In this way, by using the combination of TRID and DMID it is possible to make e-commerce transactions more secure and less susceptible to fraud. Moreover, this enhances security for both direct merchants as well as indirect merchants using services of a payment provider without requiring significant changes to existing infrastructure or process.

It will be appreciated that any of the methods described herein, and any particular step of said methods, can be implemented by a computer. Such implementation may take the form of a processor executing instructions stored on a non-transitory computer-readable medium or media, wherein when executed the instructions cause the processor to perform any one or more steps of any of the methods described herein. Individual steps of a method may be implemented by different processors that are all collectively acting in accordance with computer-readable instructions stored on one or more storage media. The processor or processors may be component(s) of system 100, for example a processor of the transaction enabler 104.

Figure 5:
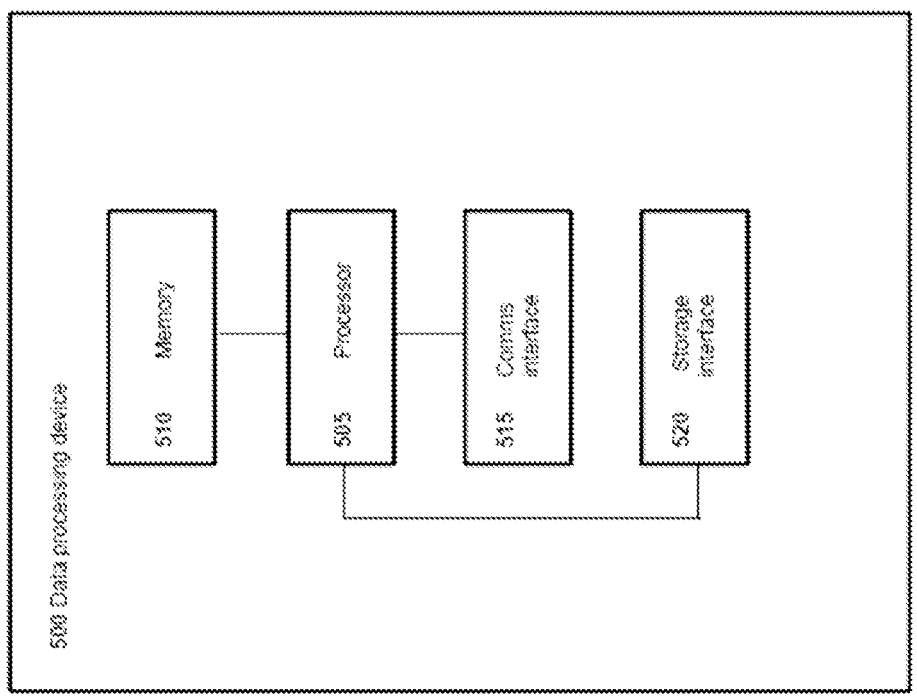
FIG. 5 shows in schematic form a data processing device that is suitable for performing the functions of any data processing device within the system shown in FIG. 1.

Equally, any steps of any of the methods described herein may be performed by data processing devices as described in respect of system 100 of FIG. 1. By way of example, FIG. 5 shows in schematic form a data processing device 500 that is suitable for performing the functions of the token requestor 103, the transaction enabler 104, the issuer 105, and processing devices associated with the user 101 and the merchants 102.

Data processing device 500 includes a processor 505 for executing instructions. Instructions may be stored in a memory 510, for example. Processor 505 may include one or more processing units (e.g., in a multi-core configuration) for executing instructions. The instructions may be executed within a variety of different operating systems on the data processing device 500, such as UNIX, LINUX, Microsoft Windows®, etc. More specifically, the instructions may cause various data manipulations on data stored in memory 510 (e.g., create, read, update, and delete procedures). It should also be appreciated that upon initiation of a computer-implemented method, various instructions may be executed during initialization. Some operations may be required in order to perform one or more methods described herein, while other operations may be more general and/or specific to a particular programming language (e.g., C, C#, C++, Java, or other suitable programming languages, etc.).

Processor 505 is operatively coupled to a communication interface 515 such that data processing device 500 is capable of communicating with a remote device, such as another data processing device of system 100. For example, communication interface 515 may receive communications from another member of system 100, depending on the function of data processing device 500 within the context of system 100.

Processor 505 may also be operatively coupled to a storage device depending on the function of data processing device 500 within the context of system 100. The storage device is any computer-operated hardware suitable for storing and/or retrieving data, where in the case of a secure storage medium the data is stored and retrieved securely.

Storage device can be integrated in data processing device 500, or it can be external to data processing device 500 and located remotely. For example, data processing device 500 may include one or more hard disk drives as a storage device. Alternatively, where the storage device is external to data processing device 500, it can comprise multiple storage units such as hard disks or solid state disks in a redundant array of inexpensive disks (RAID) configuration. The storage device may include a storage area network (SAN) and/or a network attached storage (NAS) system.

Processor 505 can be operatively coupled to the storage device via a storage interface 520. Storage interface 520 is any component capable of providing processor 505 with access to the storage device. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to the storage device.

Memory 510 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

The invention claimed is:

1. A computer-implemented method of processing a data transfer comprising:
generating a first identifier for a merchant;
linking the first identifier with a second identifier associated with a tokenization domain;
sending the first identifier and the second identifier to a first server;
verifying the merchant based at least on the first identifier and the second identifier;
sending a message to a second server, the message comprising at least the first identifier, the second identifier, and a name associated with the first identifier; and
authenticating the data transfer for the merchant based at least on the information contained in the message.

2. The method of claim 1, further comprising generating the second identifier by the first server upon receiving a request from a token requestor.

3. The method of claim 1, further comprising generating the first identifier by the first server upon receiving a request from the merchant.

4. The method of claim 1, further comprising generating the first identifier by the first server upon receiving a request from a token requestor on behalf of the merchant.

5. The method of claim 1, wherein the message further comprises a name associated with the second identifier.

6. The method of claim 1, further comprising generating a token to initiate the data transfer based at least on the first identifier and the second identifier.

7. The method of claim 1, further comprising requesting a cryptogram from the first server to initiate the data transfer.

8. The method of claim 7, wherein the message further comprises a validation result of the cryptogram.

9. The method of claim 8, wherein authenticating the data transfer comprises reviewing the validation result.

* * * * *